United States Patent
Mermelstein

(10) Patent No.: US 6,715,106 B1
(45) Date of Patent: Mar. 30, 2004

(54) BIOS CORRUPTION DETECTION SYSTEM AND METHOD

(75) Inventor: Lois D. Mermelstein, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 493 days.

(21) Appl. No.: 09/709,831

(22) Filed: Nov. 10, 2000

(51) Int. Cl.$^7$ .............................................. G06F 15/177
(52) U.S. Cl. ........................... 714/36; 714/25; 714/30; 713/2
(58) Field of Search ........................... 714/36, 25, 30; 713/2

(56) References Cited

U.S. PATENT DOCUMENTS

| | | | |
|---|---|---|---|
| 5,388,267 A | 2/1995 | Chan et al. | |
| 5,758,170 A | 5/1998 | Woodward et al. | |
| 5,835,761 A | * 11/1998 | Ishii et al. ................... | 713/100 |
| 5,864,698 A | * 1/1999 | Krau et al. ..................... | 713/2 |
| 5,964,873 A | * 10/1999 | Choi .............................. | 713/2 |
| 6,185,696 B1 | * 2/2001 | Noll .............................. | 714/6 |
| 6,308,265 B1 | * 10/2001 | Miller ........................... | 714/6 |
| 6,393,559 B1 | * 5/2002 | Alexander ..................... | 713/2 |
| 6,459,624 B1 | * 10/2002 | Kuo ........................ | 365/185.33 |
| 6,487,464 B1 | * 11/2002 | Martinez et al. ............... | 700/79 |
| 6,625,730 B1 | * 9/2003 | Angelo et al. ................. | 713/2 |
| 6,629,259 B2 | * 9/2003 | Lee ............................... | 714/2 |

* cited by examiner

*Primary Examiner*—Scott Baderman
*Assistant Examiner*—Anne L. Damiano
(74) *Attorney, Agent, or Firm*—Haynes and Boone, LLP

(57) ABSTRACT

One embodiment is a method of detecting BIOS corruption that does not require reprogramming of the boot block or calculation of cyclic redundancy ("CRC") codes. A simple check is performed using only the first byte or bytes of BIOS to be erased ("First Byte") and the last byte or bytes of BIOS to be programmed ("Last Byte") during reprogramming. Specifically, if both the First and Last Bytes are programmed, indicating either that erasure did not occur or that reprogramming was successful, the BIOS is not corrupt and no remedial action need be taken. If the First Byte is erased and the Last Byte is programmed, indicating that a failure occurred during erasure, the BIOS is corrupt and remedial action must be taken. Similarly, if the First Byte is programmed and the Last Byte is erased, indicating that a failure occurred during reprogramming, the BIOS is corrupt and remedial action must be taken. Finally, if both the First and Last Bytes are erased, the BIOS is corrupt and remedial action must be taken.

27 Claims, 1 Drawing Sheet

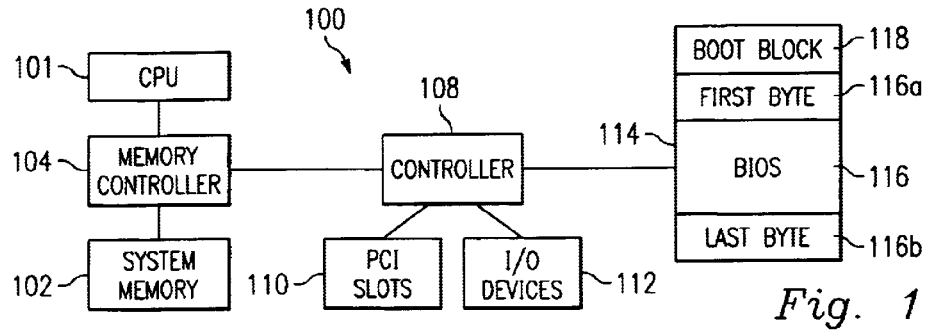
Fig. 1
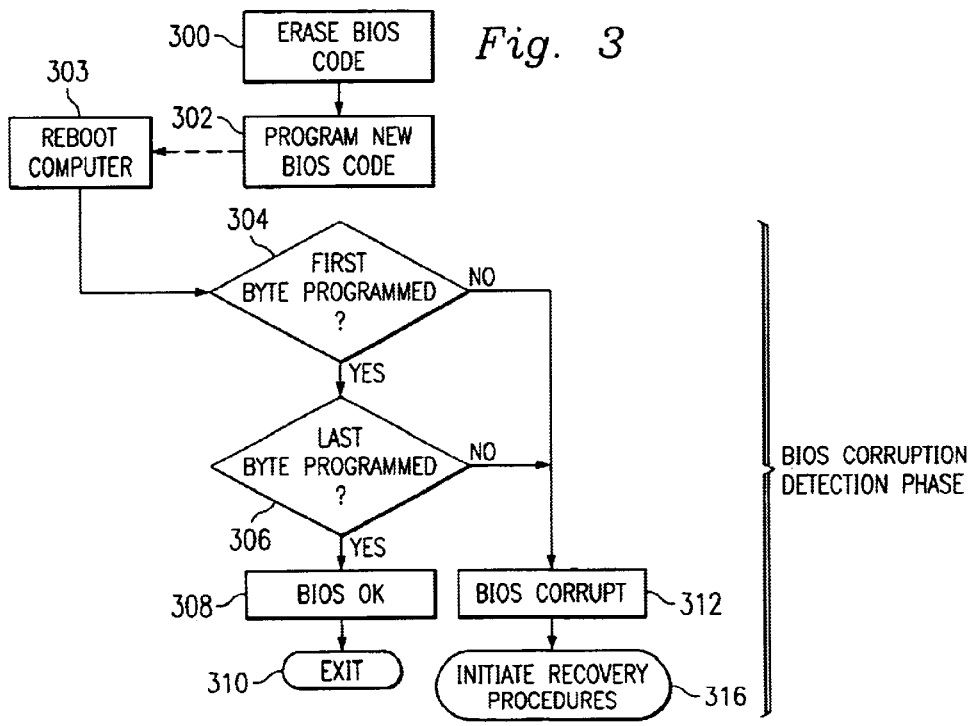
Fig. 2
Fig. 3

BIOS CORRUPTION DETECTION SYSTEM AND METHOD

BACKGROUND

The disclosures herein relate generally to computer systems and more particularly to a method of detecting BIOS corruption in a computer system.

Computer systems require functional basic input/output system code, or "BIOS," in order to boot. The BIOS code is stored in a flash memory, such as a flash EPROM or "EEPROM", and is typically updated via an executable program that "flashes" the EEPROM, thus erasing the old BIOS image, and then reprograms the EEPROM with a new BIOS image. If this programming process is interrupted, for example, by a power failure, the BIOS will be only partially programmed, or corrupted, and therefore nonfunctional.

To enable recovery from the above-described situation, a special area of the BIOS flash RAM storage referred to as the "boot block" contains sufficient information to initiate the BIOS recovery process ("recovery code"). Because the boot block is "lockable", the recovery code stored therein is generally not vulnerable to programming process interruptions and remains intact.

Currently, BIOS image corruption detection is accomplished by performing a cyclic redundancy check ("CRC") on the BIOS image (or a predefined portion thereof) to calculate a CRC code therefor and then comparing the calculated CRC code to a CRC code for the image (or predefined portion) stored in the boot block. To complete the CRC check in a user-acceptable time, many of the early POST procedures, such as chipset initialization and memory configuration, are performed first; i.e., prior to computing the CRC code, using code stored in the boot block ("boot block POST code"). After the CRC code has been calculated and compared, if the BIOS image is intact (i.e., not corrupt), many of the same procedures must be performed again using code from a non-protected flash memory area ("BIOS POST code") to ensure that up-to-date BIOS code is being used. This is because it is possible that the boot block POST code and the BIOS POST code may be different, in which case the BIOS POST code will be more up-to-date. The difficulty in keeping code stored in the boot block area sufficiently up-to-date to enable the CRC code to be calculated results in the code being reprogrammed on every flash update, thus voiding the protection mechanism.

Therefore, what is needed is a method of detecting corruption of the BIOS code that does not require CRC checking or reprogramming of the boot block upon each reprogramming of the BIOS code.

SUMMARY

One embodiment accordingly, provides for detecting a corrupt basic input/output system (BIOS) stored in a flash memory device of a computer. Responsive to the computer being booted, it is determined whether a first byte of the BIOS is programmed. Responsive to that determination, it is determined whether a last byte of the BIOS is programmed. Further, responsive to the last byte determination, it is concluded that the BIOS is not corrupt and normal POST procedures are carried out.

A principal advantage of this embodiment is that it does not require the boot block to be erased and reprogrammed each time the BIOS code is reprogrammed, thereby maintaining the integrity of this portion of the BIOS code as originally intended.

Another advantage of this embodiment is that it is faster and more efficient than the methods of BIOS corruption detection that employ CRC codes.

BRIEF DESCRIPTION OF THE DRAWING FIGURES

FIG. 1 is a system block diagram of a computer embodying features of one embodiment.

FIG. 2 is a truth table illustrating possible combinations of states of the First and Last Bytes and the meaning of each combination.

FIG. 3 is a flow chart of the operation of the embodiment of FIG. 1.

DETAILED DESCRIPTION

FIG. 1 is a system block diagram of a computer 100 embodying features of the present disclosure. As shown in FIG. 1, the computer 100 includes a central processing unit ("CPU") 101 connected to system memory 102 via a memory controller 104. Also connected to the memory controller 106 is a second controller 108 for controlling a plurality of PCI slots 110, various I/O devices, collectively represented by I/O device 112, and a flash memory device 114. BIOS code 116 is stored in the flash memory device 114, such as a flash EPROM or EEPROM.

The flash memory device 114 also includes a boot block 118 containing kernel code required to reboot the computer 100 in the event the BIOS code 116 is corrupted. The boot block 118 is hardware-lockable to provide a highly secure storage location for the kernel. The BIOS code 116 itself is reprogrammable in a conventional fashion, with the entire BIOS code being first erased and then subsequently reprogrammed with new BIOS code. A First Byte 116a represents the first byte or bytes to be erased during BIOS reprogramming. Similarly, a Last Byte 116b represents the last byte or bytes to be reprogrammed during BIOS reprogramming. It should be recognized that the First Byte 116a and Last Byte 116b are represented in FIG. 1 in their respective logical, although not necessarily physical, locations in the BIOS code 116.

FIG. 2 is a truth table 200 illustrating possible combinations of states of the First and Last Bytes and the meaning of each combination. In particular, the truth table 200 includes a first column 202a entitled "First Byte" for indicating the status of the First Byte (i.e., programmed or erased), a second column 202b entitled "Last Byte" for indicating the status of the Last Byte, and a third column 202c entitled "Meaning" for indicating meaning of the First Byte/Last Byte status combination (i.e., OK or corrupt). Referring to a first row 204a, the respective entries in both the first column 202a and second column 202b are "Programmed". In this situation, either reprogramming has not taken place or has taken place successfully, therefore, the "Meaning" of this combination, as indicated in the third column 202c, is "OK". Referring to a second row 204b, the entry in the first column 202a is "Erased" and the entry in the second column 202b is "Programmed", indicating that a failure occurred during erasure. Accordingly, the entry in the third column 202c is "Corrupt". Similarly, referring to a third row 204c, the entry in the first column 202a is "Programmed" and the entry in the second column 202b is "Erased", indicating that a failure occurred during programming. Accordingly, the entry in the third column 202c is "Corrupt". Finally, referring to a fourth row 204d, the respective entries in both the first column 202a and second column 202b are "Erased". In this situation, for whatever reason, the flash memory device 114 is blank, therefore, the "Meaning" of this combination, as indicated in the third column 202c, is "Corrupt".

FIG. 3 is a flowchart of the operation of an embodiment. In response to a command to reprogram the BIOS code 116 stored in the flash memory device 116, in step 300, the flash memory device is erased. In step 302, the flash memory device 114 is reprogrammed, or "flashed," in a conventional manner with new BIOS code. At some later point in time, in step 303, the computer 100 is rebooted. Subsequently, a BIOS corruption detection phase is entered to determine whether the BIOS code is OK or corrupt. It should be recognized that the following steps will be executed each time the computer 100 is rebooted, whether or not the flash memory device 114 has been flashed. Specifically, in step 304, a determination is made whether the First Byte 116a is programmed. If so, execution proceeds to step 306, in which a determination is made whether the Last Byte 116b is programmed. If so, execution proceeds to step 308 in which it is determined that the BIOS has been successfully reprogrammed and execution terminates in step 310.

Alternatively, if in step 304 it is determined that the First Byte 116a is not programmed or if in step 306 it is determined that the Last Byte 116b is not programmed, execution proceeds to step 312, in which it is determined that the BIOS is corrupt and BIOS recovery is initiated in a conventional manner in step 314.

In view of the foregoing, one embodiment, accordingly, provides a method of detecting BIOS corruption that does not require reprogramming of the boot block. In particular, instead of performing a CRC check on the BIOS, a simple check is performed using only the first byte or bytes of the BIOS to be erased (hereinafter "First Byte") and the last byte or bytes of the BIOS to be programmed (hereinafter "Last Byte") during reprogramming. Specifically, if both the First and Last Bytes are programmed, indicating either that erasure did not occur or that reprogramming was successful, the BIOS is not corrupt and no remedial action need be taken. If the First Byte is erased and the Last Byte is programmed, indicating that a failure occurred during erasure, the BIOS is corrupt and remedial action must be taken. Similarly, if the First Byte is programmed and the Last Byte is erased, indicating that a failure occurred during reprogramming, the BIOS is corrupt and remedial action must be taken. Finally, if both the First and Last Bytes are erased, the BIOS is corrupt and remedial action must be taken.

In above-described manner, corruption can be detected quickly and without lengthy code preambles, as normal POST and recovery code can be separated. As a result, the recovery code stored in the boot block no longer needs to be reprogrammed on every flash update, so the protection mechanism remains intact. Moreover, the recovery code can reuse parts of the POST code, but if the POST code hangs later, there is no need to update the recovery code, which need not be optimal, just sufficient to enable recovery.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of detecting a corrupt basic input/output system ("BIOS") stored in a flash memory device of a computer, the method comprising:

determining if at least one of a first and last byte of BIOS are erased;

responsive to the computer being booted, determining whether the first byte of the BIOS is programmed;

responsive to a determination that the first byte of the BIOS is programmed, determining whether the last byte of the BIOS is programmed; and responsive to a determination that the last byte of the BIOS is programmed, concluding that the BIOS is not corrupt and proceeding with normal POST procedures, whereby BIOS image corruption detection is accomplished without requiring a cyclic redundancy check and a boot block reprogramming.

2. The method of claim 1 further comprising:

responsive to a determination that the last byte of the BIOS is not programmed, concluding that the BIOS is corrupt and proceeding with BIOS recovery procedures.

3. The method of claim 1 further comprising:

responsive to a determination that the first byte of the BIOS is not programmed, concluding that the BIOS is corrupt and proceeding with BIOS recovery procedures.

4. The method of claim 1 further comprising:

responsive to a determination that the first byte of the BIOS is not programmed, determining whether the last byte of the BIOS is programmed; and responsive to a determination that the last byte of the BIOS is not programmed, concluding that the BIOS is corrupt and proceeding with BIOS recovery procedures.

5. The method of claim 1 wherein the first byte of the BIOS comprises the first one or more bytes of memory area to be erased and subsequently reprogrammed when the flash memory device is reprogrammed during a BIOS update.

6. The method of claim 1 wherein the last byte of the BIOS comprises the last one or more bytes of memory area to be erased and subsequently reprogrammed when the flash memory device is reprogrammed during a BIOS update.

7. The method of claim 1 wherein the flash memory device is an electrically erasable programmable read only memory ("EEPROM") device.

8. A system of detecting a corrupt basic input/output system ("BIOS") stored in a flash memory device of a computer, the system comprising:

means for determining if at least one of a first and last byte of BIOS are erased;

means, responsive to the computer being booted, for determining whether a the first byte of the BIOS is programmed;

means, responsive to a determination that the first byte of the BIOS is programmed, for determining whether the last byte of the BIOS is programmed; and means, responsive to a determination that the last byte of the BIOS is programmed, for concluding that the BIOS is not corrupt and proceeding with normal POST procedures, whereby BIOS image corruption detection is accomplished without requiring a cyclic redundancy check and a boot block reprogramming.

9. The system of claim 8 further comprising:

means, responsive to a determination that the last byte of the BIOS is not programmed, for concluding that the BIOS is corrupt and proceeding with BIOS recovery procedures.

10. The system of claim 8 further comprising:

means, responsive to a determination that the first byte of the BIOS is not programmed, for concluding that the BIOS is corrupt and proceeding with BIOS recovery procedures.

11. The system of claim 8 further comprising:

means, responsive to a determination that the first byte of the BIOS is not programmed, for determining whether the last byte of the BIOS is programmed; and means, responsive to a determination that the last byte of the BIOS is not programmed, for concluding that the BIOS is corrupt and proceeding with BIOS recovery procedures.

12. The system of claim 8 wherein the first byte of the BIOS comprises the first one or more bytes of memory area to be erased and subsequently reprogrammed when the flash memory device is reprogrammed during a BIOS update.

13. The system of claim 8 wherein the last byte of the BIOS comprises the last one or more bytes of memory area to be erased and subsequently reprogrammed when the flash memory device is reprogrammed during a BIOS update.

14. The system of claim 8 wherein the flash memory device is an electrically erasable programmable read only memory ("EEPROM") device.

15. The system of claim 8 wherein the flash memory device comprises a lockable boot block for storing BIOS recovery code.

16. A computer program product for detecting a corrupt basic input/output system ("BIOS") stored in a flash memory device of a computer, the computer program product comprising:

a computer program processable by a computer for causing the computer to:
determine whether one of a first and last byte of BIOS are erased;
determine whether a first byte of the BIOS is programmed responsive to anytime the computer is booted;
determine whether a last byte of the BIOS is programmed responsive to a determination that the first byte of the BIOS is programmed; and
conclude that the BIOS is not corrupt and proceed with normal POST procedures responsive to a determination that the last byte of the BIOS is programmed; and apparatus from which the computer program is accessible by the computer system, whereby BIOS code image corruption detection is accomplished without requiring a cyclic redundancy check and a boot block reprogramming.

17. The computer program product of claim 16 wherein the computer program further causes the computer to conclude that the BIOS is corrupt and proceed with BIOS recovery procedures responsive to a determination that the last byte of the BIOS is not programmed.

18. The computer program product of claim 16 wherein the computer program further causes the computer to conclude that the BIOS is corrupt and proceed with BIOS recovery procedures responsive to a determination that the first byte of the BIOS is not programmed.

19. The computer program product of claim 16 wherein the computer program further causes the computer to:
determine whether the last byte of the BIOS is programmed responsive to a determination that the first byte of the BIOS is not programmed; and
conclude that the BIOS is corrupt and proceed with BIOS recovery procedures responsive to a determination that the last byte of the BIOS is not programmed.

20. The computer program product of claim 16 wherein the first byte of the BIOS comprises the first one or more bytes of memory area to be erased and subsequently reprogrammed when the flash memory device is reprogrammed during a BIOS update.

21. The computer program product of claim 16 wherein the last byte of the BIOS comprises the last one or more bytes of memory area to be erased and subsequently reprogrammed when the flash memory device is reprogrammed during a BIOS update.

22. A computer system comprising:

a processor;

a flash memory device electrically connected to the processor;

basic input/output system ("BIOS") code stored in the flash memory device;

means for determining if at least one of a first and last byte of BIOS are erased;

wherein, responsive to the computer system being booted, a determination is made whether a first byte of the BIOS is programmed;

wherein, responsive to a determination that the first byte of the BIOS is programmed, a determination is made whether a last byte of the BIOS is programmed; and wherein, responsive to a determination that the last byte of the BIOS is programmed, a conclusion is drawn that the BIOS is not corrupt and normal POST procedures initiated, whereby BIOS image corruption detection is accomplished without requiring a cyclic redundancy check and a boot block reprogramming.

23. The computer system of claim 22 wherein responsive to a determination that the last byte of the BIOS is not programmed, a conclusion is drawn that the BIOS is corrupt and BIOS recovery procedures are initiated.

24. The computer system of claim 22 wherein responsive to a determination that the first byte of the BIOS is not programmed, a conclusion is drawn that the BIOS is corrupt and BIOS recovery procedures are initiated.

25. The computer system of claim 22 wherein responsive to a determination that the first byte of the BIOS is not programmed, a determination is made whether the last byte of the BIOS is programmed; and wherein responsive to a determination that the last byte of the BIOS is not programmed, a conclusion is drawn that the BIOS is corrupt and BIOS recovery procedures are initiated.

26. The computer system of claim 22 wherein the flash memory device includes a lockable boot block for storing BIOS recovery code.

27. The computer system of claim 22 wherein the flash memory device is an electrically erasable programmable read only memory ("EEPROM") device.

\* \* \* \* \*